(12) United States Patent
Park

(10) Patent No.: US 11,990,604 B2
(45) Date of Patent: *May 21, 2024

(54) METHOD AND SYSTEM FOR ALL-CONDUCTIVE BATTERY ELECTRODES

(71) Applicant: Enevate Corporation, Irvine, CA (US)

(72) Inventor: Benjamin Park, Irvine, CA (US)

(73) Assignee: ENEVATE CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,627

(22) Filed: Nov. 7, 2022

(65) Prior Publication Data

US 2023/0056009 A1 Feb. 23, 2023

Related U.S. Application Data

(63) Continuation of application No. 16/859,804, filed on Apr. 27, 2020, now Pat. No. 11,502,286.

(51) Int. Cl.
*H01M 4/134* (2010.01)
*H01M 4/02* (2006.01)
*H01M 4/04* (2006.01)
*H01M 4/1395* (2010.01)
*H01M 4/38* (2006.01)
(Continued)

(52) U.S. Cl.
CPC ......... *H01M 4/134* (2013.01); *H01M 4/0404* (2013.01); *H01M 4/0471* (2013.01); *H01M 4/1395* (2013.01); *H01M 4/386* (2013.01); *H01M 4/625* (2013.01); *H01M 4/661* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2017/0170466 A1 6/2017 Miyake et al.
2018/0198114 A1 7/2018 Bonhomme et al.
(Continued)

OTHER PUBLICATIONS

International Search Report and Written Opinion for PCT/US2021/28294, dated Jul. 27, 2021 (8 pages).
(Continued)

*Primary Examiner* — Eli S Mekhlin
(74) *Attorney, Agent, or Firm* — McAndrews, Held & Malloy, Ltd.

(57) ABSTRACT

Systems and methods for all-conductive battery electrodes may include an electrode coating layer on a current collector, where the electrode coating layer comprises more than 50% silicon, and where each material in the electrode has a resistivity of less than 100 Ω-cm. The silicon may have a resistivity of less than 10 Ω-cm, less than 1 Ω-cm, or less than 1 mΩ-cm. The electrode coating layer may comprise pyrolyzed carbon and/or conductive additives. The current collector comprises a metal foil. The metal current collector may comprise one or more of a copper, tungsten, stainless steel, and nickel foil in electrical contact with the electrode coating layer. The electrode coating layer comprises more than 70% silicon. The electrode may be in electrical and physical contact with an electrolyte. The electrolyte may comprise a liquid, solid, or gel. The battery electrode may be in a lithium ion battery.

22 Claims, 6 Drawing Sheets

(51) Int. Cl.
*H01M 4/62* (2006.01)
*H01M 4/66* (2006.01)
*H01M 10/0525* (2010.01)

(56) References Cited

U.S. PATENT DOCUMENTS

2018/0309119 A1  10/2018  Ogino et al.
2019/0355966 A1  11/2019  Kamath et al.

OTHER PUBLICATIONS

Enhanced electrochemical properties of a Si-based anode using an electrochemically active polyamide imide binder, Journal of Power Sources, 2008 (5 pages).
By Ng et al., "Amorphous Carbon-Coated Silicon Nanocomposites: A Low Temperature Sunthesis via Spray Pyrolsis and Their Application as High Capacity Anodes for Lithium Ion Batteries", J. Phys. Chem, 2007 (8 pages).

METHOD AND SYSTEM FOR ALL-CONDUCTIVE BATTERY ELECTRODES

CROSS-REFERENCE TO RELATED APPLICATIONS/INCORPORATION BY REFERENCE

The present application is a continuation of U.S. patent application Ser. No. 16/859,804, filed Apr. 27, 2020, now U.S. Pat. No. 11,502,286, the disclosure of which is hereby incorporated by reference in its entirety.

FIELD

Aspects of the present disclosure relate to energy generation and storage. More specifically, certain embodiments of the disclosure relate to a method and system for all-conductive battery electrodes.

BACKGROUND

Conventional approaches for battery electrodes may cause electrode coating layer to lose contact with the electrode.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for all-conductive battery electrodes, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
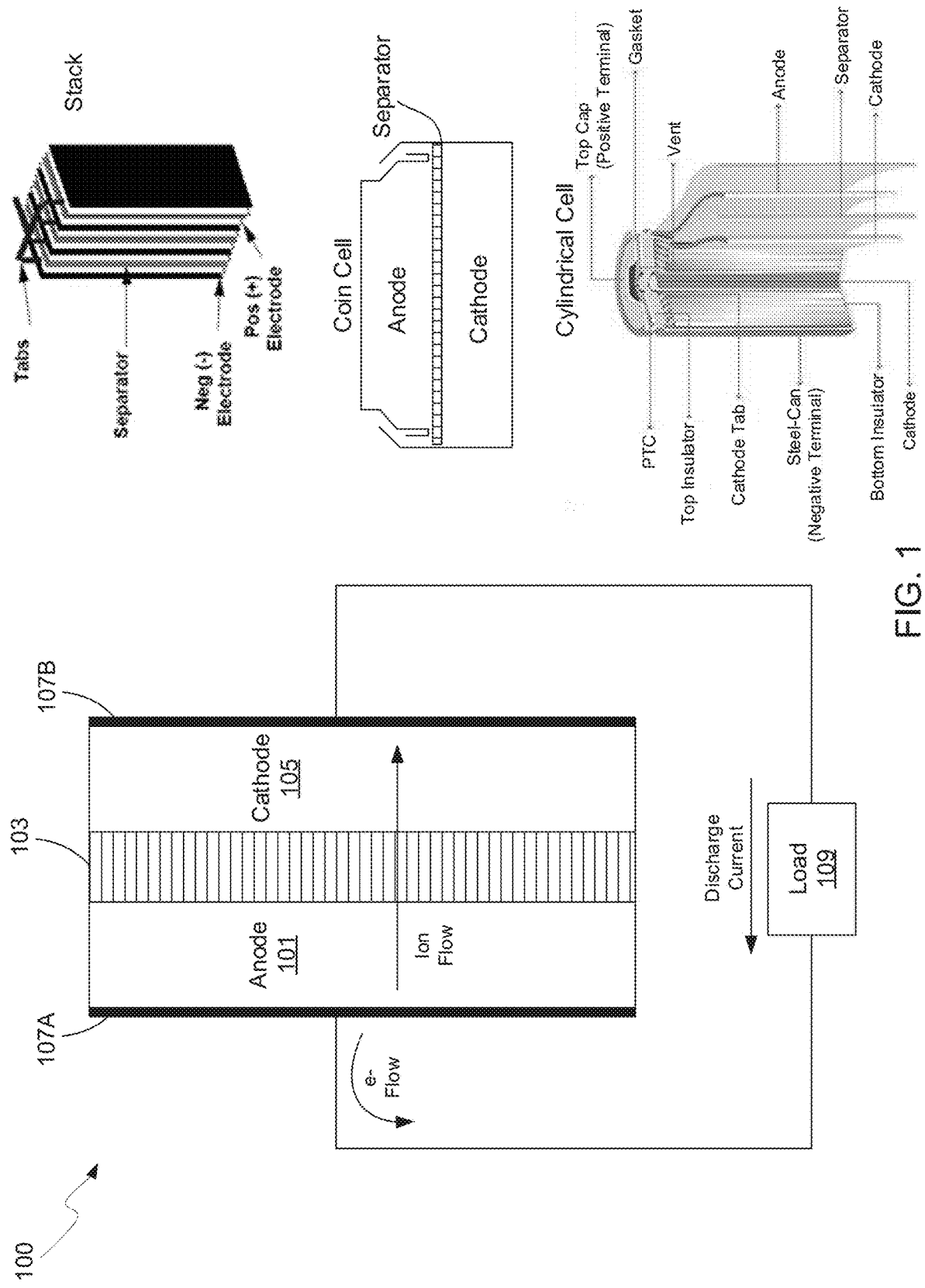
FIG. 1 is a diagram of a battery with a silicon-dominant anode, in accordance with an example embodiment of the disclosure.

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the cell shown in FIG. 1 is a very simplified example merely to show the principle of operation of a lithium ion cell. Examples of realistic structures is shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the electrode coating layer in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or electrode coating layer coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the electrode coating layer used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the electrode coating layer for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. With demand for lithium-ion battery performance improvements such as higher energy density and fast-charging, silicon is being added as an electrode coating layer or even completely replacing graphite as a dominant anode material. Most electrodes that are considered "silicon anodes" in the industry are graphite anodes with silicon added in small quantities (typically <20%). These graphite-silicon mixture anodes must utilize the graphite, which has a lower lithiation voltage compared to silicon; the silicon has to be nearly fully lithiated in order to utilize the graphite. Therefore, these electrodes do not have the advantage of a silicon or silicon composite anode where the voltage of the electrode is substantially above 0V vs Li/Li+ and thus are less susceptible to lithium plating. Furthermore, these electrodes can have significantly higher excess capacity on the silicon versus the opposite electrode to further increase the robustness to high rates.

Silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

The silicon source for fabricating silicon-dominant anodes is important to cell performance. In this disclosure, silicon-dominant anodes with higher impurity levels, which impact anode resistivity and SEI formation, and with conductive pyrolyzed binder material result in increased cell capacity retention. In conventional silicon anodes, which are typically graphite anodes with silicon added up to about 20%, the binder is non-conductive upon pyrolysis. Example binder materials in these electrodes are styrene butadiene rubber (SBR) or carboxymethyl cellulose (CMC). For such materials, conductive additives are needed to increase electrode conductivity, but this requires enough additive that the conductive material is close enough to tunnel across the non-conductive pyrolyzed binder, meaning there is less binder material by weight. For the direct coated, or continuous electrodes, described here, the binder material is conductive after pyrolysis, which in conjunction with the higher impurity level and thus higher conductivity silicon results in an all-conductive electrode.

Figure 2:
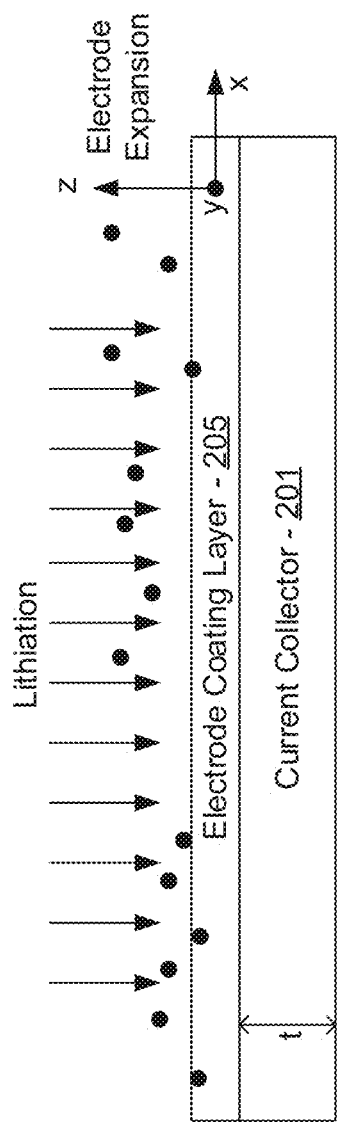
FIG. 2 illustrates an anode during lithiation, in accordance with an example embodiment of the disclosure.

FIG. 2 illustrates an anode during lithiation, in accordance with an example embodiment of the disclosure. Referring to FIG. 2, there are shown a current collector 201 and an electrode coating layer 205. The layer thicknesses are not necessarily shown to scale. In an example scenario, the anode electrode coating layer 205 comprises silicon particles in a binder material and a solvent, where the electrode coating layer is pyrolyzed to turn the binder into a conductive carbon that provides a structural framework around the silicon particles and also provides electrical conductivity. The electrode coating layer 205 may comprise active material that is utilized in the lithiation/delithiation process and other materials such as pyrolyzed binder, conductive additives, etc.

The current collector 201 may comprise a metal film, such as copper, nickel, or titanium, for example, although other conductive foils may be utilized depending on desired tensile strength. The current collector 201 may comprise electrode perforations formed therein to allow lithiation to pass through from the side of the current collector 201 opposite to the electrode coating layer 205. The electrode coating layer 205 may be on both sides of the current collector 201.

FIG. 2 also illustrates lithium ions impinging upon and lithiating the electrode coating layer 205 when incorporated into a cell with a cathode, electrolyte, and separator (not shown). The lithiation of silicon-dominant anodes causes expansion of the material, where horizontal expansion is represented by the x and y axes, and thickness expansion is represented by the z-axis, as shown. The current collector 201 has a thickness t, where a thicker foil provides greater strength and providing the bond with the electrode coating layer 205 is strong enough, restricts expansion in the x- and y-directions, resulting in greater z-direction expansion, thus anisotropic expansion. Example thicker foils may be greater than 10 µm thick, such as 20 µm for copper, for example, while thinner foils may be less than 10 µm, such as 5-6 µm thick for copper.

The electrode coating layer 205 may comprise conductive silicon and pyrolyzed binder material, resulting in an all-conductive electrode. This is shown further with respect to FIGS. 3-6.

Figure 3:
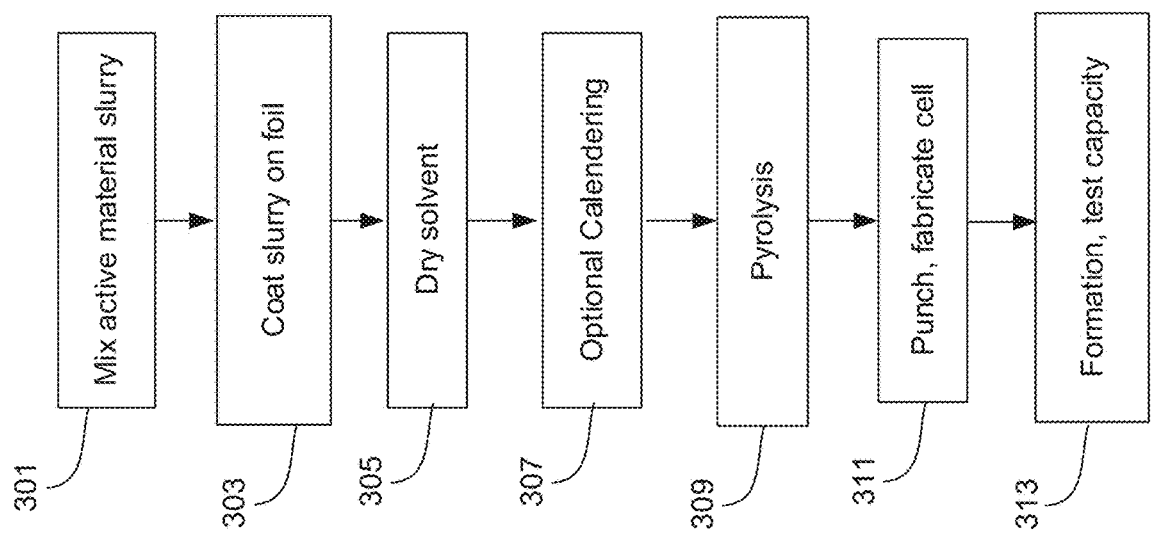
FIG. 3 is a flow diagram of a process for fabricating cells, in accordance with an example embodiment of the disclosure.

FIG. 3 is a flow diagram of a direct coating process for fabricating a cell, in accordance with an example embodiment of the disclosure. This process comprises physically mixing the electrode coating layer, conductive additive, and binder together, and coating it directly on a current collector. This example process comprises a direct coating process in which an anode or cathode slurry is directly coated on a copper foil using a binder such as Sodium Alginate, PAI, PI and mixtures and combinations thereof.

In step 301, the raw electrode coating layer may be mixed using a binder/resin (such as PI, PAI), solvent, and conductive carbon. For example, for the anode, graphene/VGCF (1:1 by weight) may be dispersed in NMP under sonication for, e.g., 1 hour followed by the addition of Super P (1:1:1 with VGCF and graphene) and additional sonication for, e.g., 45-75 minutes. Silicon powder with a desired particle size and impurity level, as discussed with respect to Table 1 below, may then be dispersed in polyamic acid resin (15% solids in N-Methyl pyrrolidone (NMP)) at, e.g., 800-1200 rpm in a ball miller for a designated time, and then the conjugated carbon/NM P slurry may be added and dispersed at, e.g., 1800-2200 rpm for, e.g., another predefined time to achieve a slurry viscosity within 2000-4000 cP and a total solid content of about 30%. The particle size and mixing times may be varied to configure the electrode coating layer density and/or roughness. Furthermore, cathode electrode coating layers may be mixed in step 301, where the electrode coating layer may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode electrode coating layer.

In step 303, the anode or slurry may be coated on a current collector such as a copper foil. Similarly, cathode electrode coating layers may be coated on a foil material, such as aluminum, for example. In one embodiment, the foil may comprise perforations through the material to allow flow-through of lithiation during operation of the cell.

The electrode coating layer may undergo a drying in step 305 resulting in less than 20% residual solvent content. An optional calendering process may be utilized in step 305 where a series of hard pressure rollers may be used to finish the film/substrate into a smoother and denser sheet of material. In step 307, the foil and coating proceeds through a roll press for lamination. Steps 303 and 305 may be repeated to coat both sides of the current collector.

In step 309, the electrode coating layer may be pyrolyzed by heating to 500-800° C. such that carbon precursors are partially or completely converted into conductive carbon. The pyrolysis step may result in an anode electrode coating layer having silicon content greater than or equal to 50% by weight, where the anode has been subjected to heating at or above 400 degrees Celsius. The binder material is conductive after pyrolysis, so along with the conductive silicon and conductive additives, the electrode is all-conductive. And native oxides formed on the silicon and/or metal foil are thin enough that electrons easily tunnel.

Pyrolysis can be done either in roll form or after punching in step 311. If done in roll form, the punching is done after the pyrolysis process. In instances where the current collector foil is not pre-punched/pre-perforated, the formed electrode may be perforated with a punching roller, for example. The punched electrodes may then be sandwiched with a separator and electrolyte to form a cell. In step 313, the cell may be subjected to a formation process, comprising initial charge and discharge steps to lithiate the anode, with some residual lithium remaining, and the cell capacity may be assessed. The perforations in the electrodes allows lithium to flow from double-sided cathodes to anodes even if one side of the cathode does not face an anode, thereby increasing cell capacity.

Figure 4:
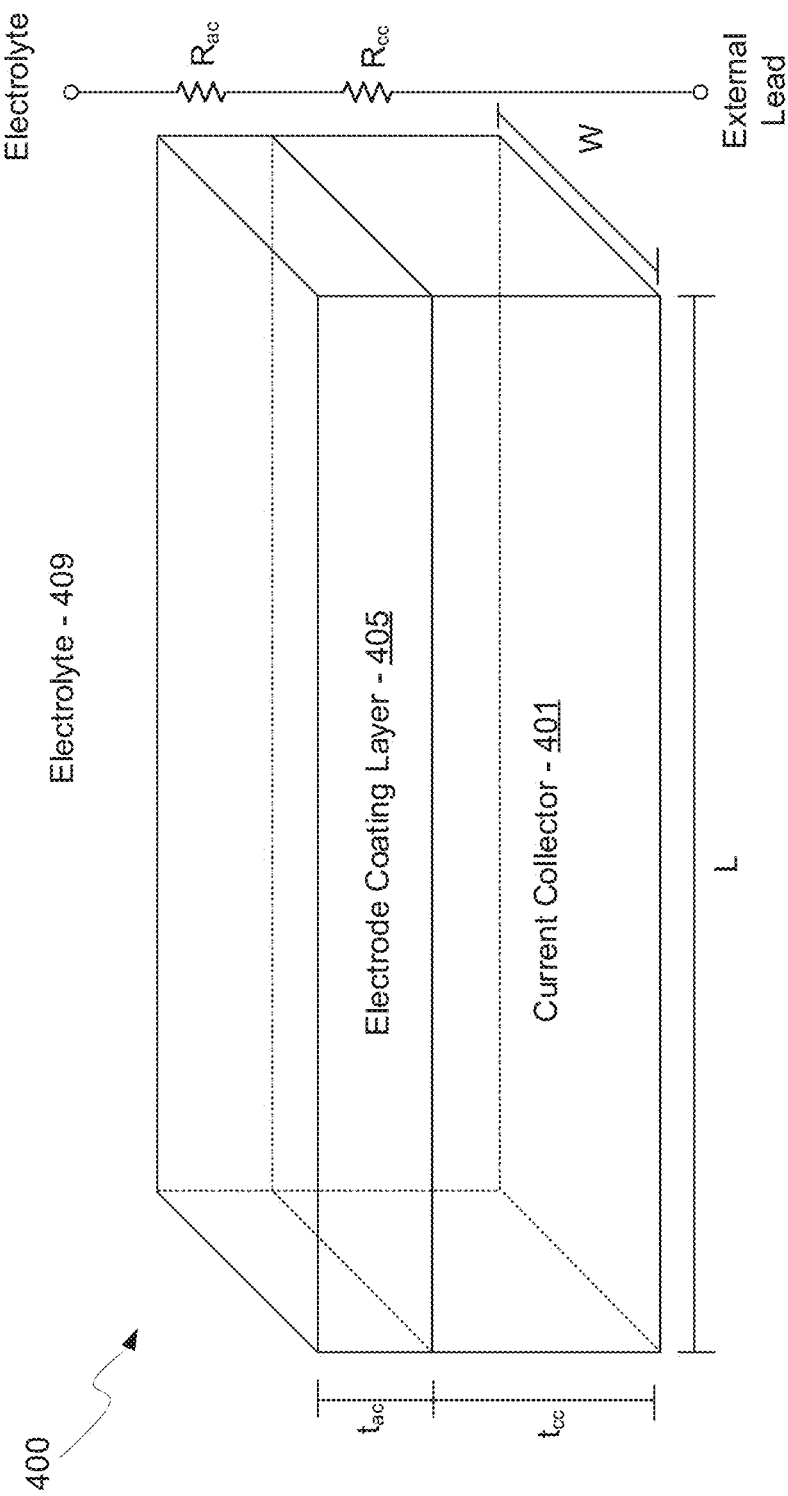
FIG. 4 illustrates an all-conductive electrode, in accordance with an example embodiment of the disclosure.

FIG. 4 illustrates an all-conductive electrode, in accordance with an example embodiment of the disclosure. Referring to FIG. 4, there is shown electrode 400 comprising a current collector 401 and electrode coating layer 405. There is also shown length and width dimensions L and W, which in this example are the same for both the layers, although this is not necessarily the case. In addition, thicknesses $t_{ac}$ and $t_{cc}$ are shown for the electrode coating layer 405 and current collector 401, respectively. The electrode coating layer 405 may be on both sides of the current collector 401.

A simplified equivalent circuit is shown to the right of the electrode 400, showing the resistances of the layers, $R_{ac}$ for the resistance of the electrode coating layer 405 and $R_{cc}$ for the current collector 401 between an external lead of the current collector 401 and the electrolyte 409. The resistance of a slab of material with the dimensions shown is defined by the relation $R=\rho*(L/W*t)$, where $\rho$ is the resistivity of the layer in ohm-cm. Similarly, the sheet resistance of each layer is its $\rho/t$. Typical resistivities for current collector materials are ~$1.7\times10^{-6}$ $\Omega$-cm for copper, ~$2.6\times10^{-6}$ $\Omega$-cm for aluminum, ~$5.6\times10^{-6}$ $\Omega$-cm for tungsten, and ~$6.9\times10^{-5}$ $\Omega$-cm for stainless steel.

The impurity level of the silicon may be configured such that the resistivity of the silicon in the electrode coating layer is less than ~100 $\Omega$-cm, for example. In another example scenario, the resistivity of the silicon may be less than ~10 $\Omega$-cm, less than ~1 $\Omega$-cm, less than 0.1 $\Omega$-cm, less than 10 m$\Omega$-cm, and in yet another example scenario, the resistivity may be less than 1 m$\Omega$-cm. If the electrode coating layer is elemental silicon with impurities, as opposed to SiO$_x$ used in conventional electrodes, the resistivity is much lower.

Furthermore, the binder material used for the electrode coating layer is conductive after pyrolysis. For example, carbonized PI may have a resistivity of less than 100 $\Omega$-cm, less than 1 $\Omega$-cm, or less than 10 m$\Omega$-cm, for example, depending on pyrolysis temperature. Similarly, carbonized PAI may have a resistivity of less than 10 $\Omega$-cm, less than 0.1 $\Omega$-cm, or less than 1 m$\Omega$-cm, for example, depending on pyrolysis temperature. In addition, conductive additives may be included in the electrode coating layer, further decreasing the resistivity, although without requiring a density of additives to cause the pyrolyzed binder to be conductive via tunneling as is needed in conventional electrodes.

An all-conductive electrode may improve cell capacity retention by reducing the capacity loss from portions of electrode coating layer breaking off due to cycling expansion/contraction during lithiation/delithiation. In conventional electrodes where the silicon is not conductive, such as with high purity silicon or SiO$_x$, any material that separates from the electrode coating layer slab although still in contact, will have a voltage drop between it and the remaining electrode coating layer, such that lithiation may occur and then become trapped as the potential drop of the separated material is such that it does not get to a delithiation voltage during operation. This is illustrated further with respect to FIGS. 5 and 6.

Figure 5:
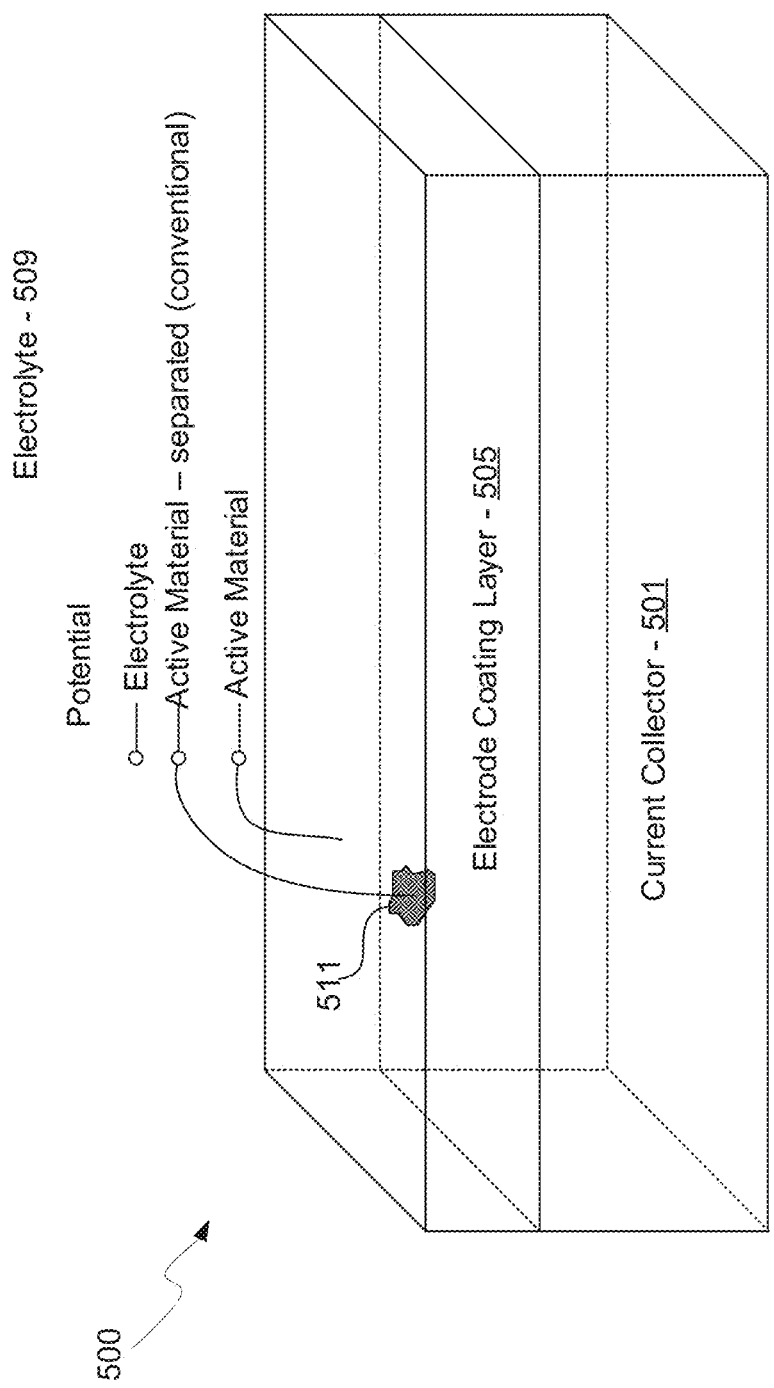
FIG. 5. Illustrates an electrode with separated electrode coating layer, in accordance with an example embodiment of the disclosure.

FIG. 5. Illustrates an electrode with separated electrode coating layer, in accordance with an example embodiment of the disclosure. Referring to FIG. 5, there is shown an electrode 500 with current collector 501 and electrode coating layer 505. There is also shown separated electrode coating layer 511, that has cracked off of the electrode coating layer 505 due to expansion and contraction during lithiation/delithiation, for example. The size and shape of the separated material 511 is just a simple example for illustration purposes, and may actually extend all the way across the width or length, through the full thickness of the electrode coating layer 505, or may be small sections distributed throughout the top surface, for example. The electrode coating layer 505 may be on both sides of the current collector 501.

In the example scenario of FIG. 5, the electrode coating layer 505 may comprise conventional materials where the binder is non-conductive following pyrolysis and/or any silicon in the electrode coating layer 505 comprises SiO$_x$ or is higher purity, such that the resistivity is significantly higher than the conductive materials in the electrode coating layer 505. For example, the silicon may be over 100 $\Omega$-cm, or may be two orders of magnitude higher resistivity than the conductive material. In this example, there will be a voltage drop from the electrode coating layer 505 to the separated electrode coating layer 511, as illustrated by the potential difference between these layers and the electrolyte 509. In an example scenario, this voltage drop may be ~0.5V. During lithiation, both the electrode coating layer 505 and separated electrode coating layer 511 may not be lithiated causing the total capacity of the electrode to drop and thus potentially reducing the capacity of the cell. If the separated electrode coating layer has been lithiated, but due to the potential drop of the separated electrode coating layer 511, it may not reach a potential where it can delithiate during delithiation, thereby trapping lithium and reducing the capacity of the cell.

Figure 6:
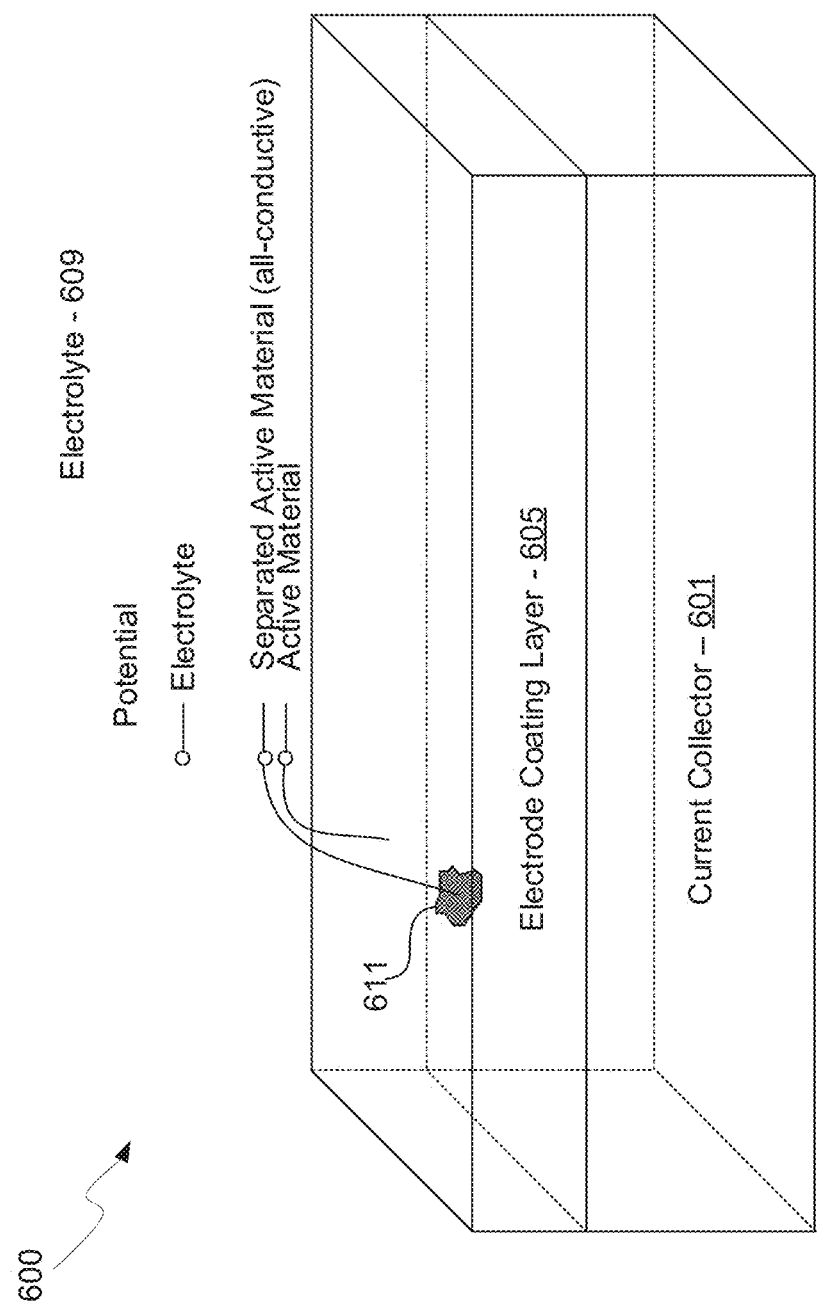
FIG. 6 Illustrates an all-conductive electrode with separated electrode coating layer, in accordance with an example embodiment of the disclosure.

FIG. 6 Illustrates an all-conductive electrode with separated electrode coating layer, in accordance with an example embodiment of the disclosure. Referring to FIG. 6, there is shown an electrode 600 with current collector 601 and electrode coating layer 605. There is also shown separated electrode coating layer 611, that has cracked off of the electrode coating layer 605 due to expansion and contraction during lithiation/delithiation, for example. The size and shape of the separated material 611 is just a simple example for illustration purposes, and may actually extend all the way across the width or length, through the full thickness of the electrode coating layer 605, or may be small sections distributed throughout the top surface, for example. The electrode coating layer 605 may be on both sides of the current collector 601.

In the example scenario of FIG. 6, the electrode coating layer 505 may comprise all low resistivity materials, where the binder is conductive following pyrolysis and the silicon in the electrode coating layer 605 comprises higher levels of impurity, such that the conductivity is similar to the other conductive materials in the electrode coating layer 505. For example, the resistivity of the silicon may be under 100 $\Omega$-cm, less than ~1 $\Omega$-cm, less than 0.1 $\Omega$-cm, 10 m$\Omega$-cm, and in yet another example scenario, the resistivity may be less than 1 m$\Omega$-cm. In these examples, there will be a much smaller voltage drop between the electrode coating layer 605 and the separated electrode coating layer 611, in contrast to the example of FIG. 5. In an example scenario, the voltage drop may be ~0.05V, as compared to the 0.5 V example of the electrode in FIG. 5. It should be noted that these voltage differences are merely examples and depend on the type of electrode coating layer and resistivities of the component materials.

The reduced potential difference is illustrated by the potential difference between these layers and the electrolyte 609 above the electrode 600 in FIG. 6. During lithiation, both the electrode coating layer 605 and the separated electrode coating layer 611 are lithiated, and since the potential drop of the separated electrode coating layer 611 is small, it still reaches a potential where it can significantly or completely delithiate, thereby retaining more of the capacity of the cell, even with the separation/pulverization of electrode coating layer due to expansion and contraction. In this case, the effect of the voltage drop will be much less compared to the effect shown in the example of the electrode in FIG. 5.

In an example embodiment of the disclosure, a method and system is described for all-conductive battery electrodes. The battery electrode may comprise an electrode coating layer on a current collector, where the electrode coating layer comprises more than 50% silicon, and where each material in the electrode has a resistivity of less than 100 $\Omega$-cm. The silicon may have a resistivity of less than 10 $\Omega$-cm, less than 1 $\Omega$-cm, or less than 1 m$\Omega$-cm. The electrode coating layer may comprise a pyrolyzed carbon and/or conductive additive. The current collector comprises a metal foil. The metal current collector may comprise a copper, tungsten, stainless steel, or nickel foil or a combination of these metals (e.g., clad or plated) in electrical contact with the electrode coating layer. The electrode coating layer comprises more than 70% silicon. The electrode may be in electrical and physical contact with an electrolyte. The electrolyte may comprise a liquid, solid, or gel. The battery electrode may be in a lithium ion battery.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A battery electrode, comprising:
   a current collector; and
   an electrode coating layer on the current collector;
   wherein the electrode coating layer comprises a binder material and more than 50% silicon; and
   wherein a difference in resistivity between the binder material and the silicon of the more than 50% silicon is less than 100 Ω-cm.

2. The battery electrode of claim 1, wherein:
   the resistivity of the binder material is less than 10 Ω-cm; and
   the resistivity of the silicon of the more than 50% silicon is less than 10 Ω-cm.

3. The battery electrode of claim 1, wherein:
   the resistivity of the binder material is less than 1 Ω-cm; and
   the resistivity of the silicon of the more than 50% silicon is less than 1 Ω-cm.

4. The battery electrode of claim 1, wherein:
   the resistivity of the binder material is less than 1 mΩ-cm; and
   the resistivity of the silicon of the more than 50% silicon is less than 1 mΩ-cm.

5. The battery electrode of claim 1, wherein the binder material comprises pyrolyzed carbon.

6. The battery electrode of claim 1, wherein the electrode coating layer comprises conductive additives.

7. The battery electrode of claim 1, wherein the current collector comprises a metal foil.

8. The battery electrode of claim 1, wherein the current collector comprises one or more of a copper, tungsten, stainless steel, and nickel foil in electrical contact with the electrode coating layer.

9. The battery electrode of claim 1, wherein the electrode coating layer comprises more than 70% silicon.

10. The battery electrode of claim 1, wherein each material in the battery electrode has a resistivity of less than 100 Ω-cm.

11. The battery electrode of claim 1, wherein the binder material provides a structural framework around silicon particles of the more than 50% silicon.

12. A method of forming a battery electrode, the method comprising:
    mixing a binder material and silicon to form a slurry; and
    forming, from the slurry, an electrode coating layer on a current collector;
    wherein the electrode coating layer comprises the binder material and more than 50% silicon; and
    wherein a difference in resistivity between the binder material and the silicon of the more than 50% silicon is less than 100 Ω-cm.

13. The method of claim 12, wherein:
    the resistivity of the binder material is less than 10 Ω-cm; and
    the resistivity of the silicon of the more than 50% silicon is less than 10 Ω-cm.

14. The method of claim 12, wherein:
    the resistivity of the binder material is less than 1 Ω-cm; and
    the resistivity of the silicon of the more than 50% silicon is less than 1 Ω-cm.

15. The method of claim 12, wherein:
    the resistivity of the binder material is less than 1 mΩ-cm; and
    the resistivity of the silicon of the more than 50% silicon is less than 1 mΩ-cm.

16. The method of claim 12, wherein the binder material comprises pyrolyzed carbon.

17. The method of claim 12, wherein the electrode coating layer comprises conductive additives.

18. The method of claim 12, wherein the current collector comprises a metal foil.

19. The method of claim 12, wherein the current collector comprises one or more of a copper, tungsten, stainless steel, or nickel foil in electrical contact with the electrode coating layer.

20. The method of claim 12, wherein the electrode coating layer comprises more than 70% silicon.

21. A battery, comprising:
    a cathode, a separator, an electrolyte, and an anode;
    wherein the anode comprises a current collector and an electrode coating layer on the current collector;
    wherein the electrode coating layer comprises a binder material and more than 50% silicon; and
    wherein a difference in resistivity between the binder material and the silicon of the more than 50% silicon is less than 100 Ω-cm.

22. The battery of claim 21, wherein:
    the anode is in electrical and physical contact with the electrolyte; and
    the electrolyte comprises a liquid, solid, or gel.

* * * * *